June 26, 1962 J. R. DOUSSARD 3,041,529
RESET RESISTOR CONFIGURATION FOR MAGNETIC AMPLIFIER
Filed Sept. 28, 1959
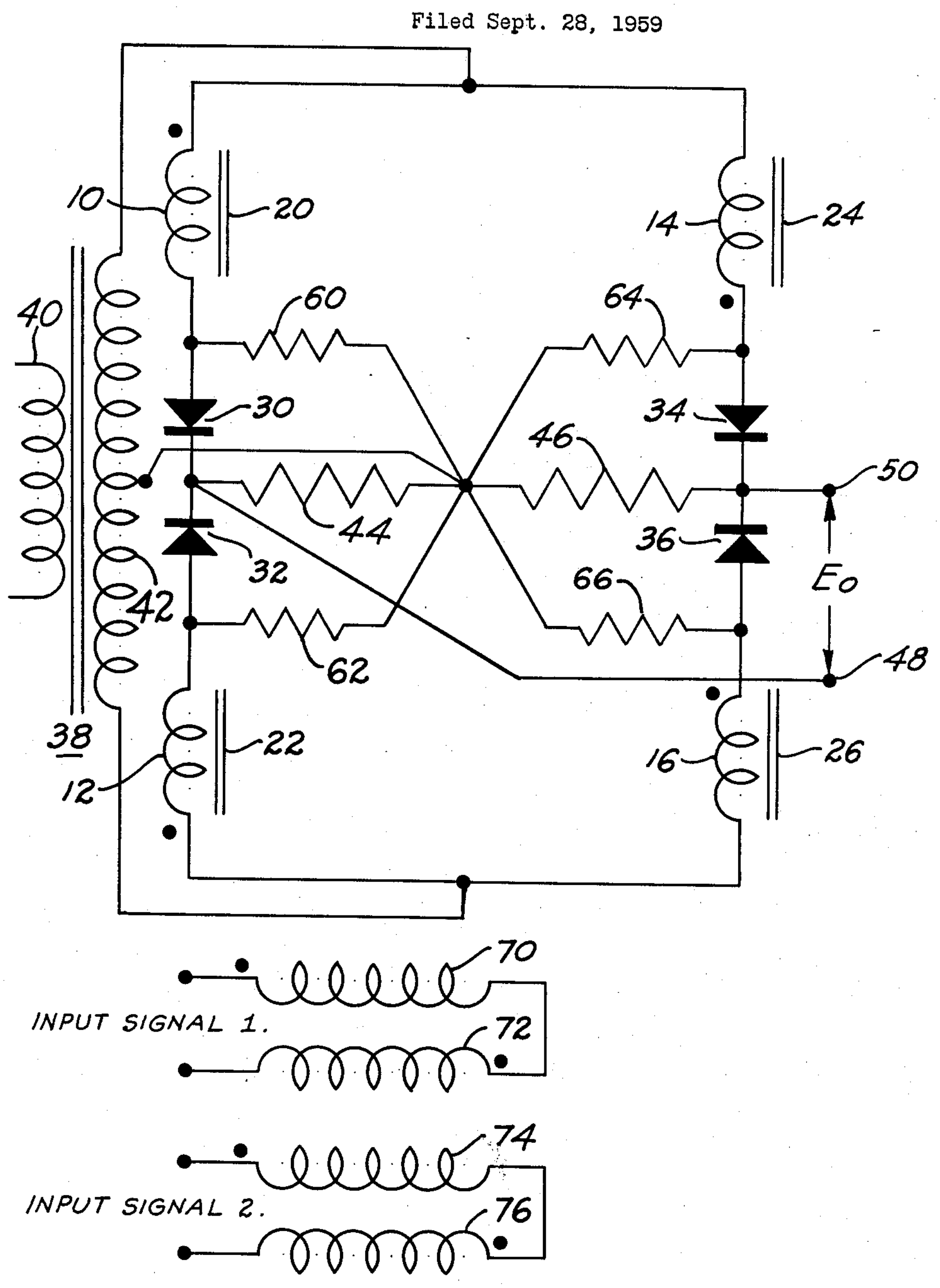
INVENTOR.
JOHN R. DOUSSARD.
BY Robert C. Smith
ATTORNEY United States Patent Office 3,041,529

Patented June 26, 1962

3,041,529

RESET RESISTOR CONFIGURATION FOR MAGNETIC AMPLIFIER

John R. Doussard, South Bend, Ind., assignor to The Bendix Corporation, a corporation of Delaware Filed Sept. 28, 1959, Ser. No. 842,850
7 Claims. (Cl. 323—89)

This invention relates to magnetic amplifiers and more particularly to an amplifier having means for minimizing gain variations with variations in the voltage and frequency of its power supply.

With the availability of superior core materials, magnetic amplifiers have come into much greater use in control systems for various types of vehicles than ever before. Particularly for airborne use, the modern magnetic amplifier has great utility as a control device because of its reliability, speed of response, and because it can be fabricated in very small and light packages. One of the problems connected with powering a magnetic amplifier from an airborne power supply is that such power supplies normally consist of an engine driven tachometer-alternator which produces an output varying in voltage and frequency with the speed of the engine. Various kinds of voltage regulating devices are customarily used to at least offset the voltage variations; however, in spite of such measures, the voltage supplied to the power transformer of the magnetic amplifier frequently varies over a significant range in both voltage and frequency. It is even conceivable that loading factors occurring elsewhere in the aircraft may cause the voltage to drop while the frequency is being increased. As is well known in the art, such changes in power supply voltage and frequency inevitably result in a gain change at the output terminals of the magnetic amplifier. Whether or not this gain change may be tolerated depends, of course, upon the particular application. Generally speaking, in control applications such as those in which a very low level direct current control signal is amplified, such gain changes are highly undesirable. It is, therefore, an object of the present invention to provide a push-pull, full-wave magnetic amplifier in which gain changes are minimized during variations in voltage and frequency of its power supply.

It is another object of the present invention to provide a push-pull, full-wave magnetic amplifier accomplishing the above object and in which a minimum of extra components are required.

Other objects and advantages will become apparent from the following specification taken in connection with the accompanying drawing in which the single FIGURE shows a push-pull, full-wave magnetic amplifier stage incorporating the teachings of my invention.

Referring to the drawing, a magnetic amplifier is shown as containing four separate branches having alternating current power windings 10, 12, 14 and 16 inductively associated with magnetic reactor or core members 20, 22, 24 and 26 respectively. Each of these branches also contains a unidirectional conduction device in the form of a rectifier, rectifier 30 being connected in series with power winding 10 and rectifiers 32, 34 and 36 being connected in series with windings 12, 14 and 16 respectively. The alternating current power supply for this magnetic amplifier is shown in the form of a transformer 38 having a primary winding 40 and a center-tapped secondary winding 42. The various branches are connected to the secondary winding 42 such that when the upper end of said winding is positive, current will be caused to flow simultaneously through power winding 10, rectifier 30, a dummy load resistor 44 and back to the center-tap of winding 42 and through power winding 14, rectifier 34, a dummy load resistor 46 and back to the center-tap of secondary winding 42. During the opposite half cycle of the supply voltage, current flows simultaneously through power winding 16, rectifier 36, dummy load resistor 46 and back to the center-tap and through power winding 12, rectifier 32, dummy load resistor 44 and back to the center-tap. The output voltage of the circuit shown is measured between a pair of terminals 48 and 50 connected in such manner as to reflect the resultant of the voltages developed across the dummy load resistors 44 and 46. In the absence of a control signal on the signal windings, discussed below, the voltage across the dummy load resistors should balance and there will be no voltage between terminals 48 and 50. Shunt resistors 60 and 62 are connected across the rectifiers 30 and 32 respectively, and the dummy load resistor 44 and shunt resistors 64 and 66 are connected across rectifiers 34 and 36 respectively and dummy load resistor 46.

The input or control voltage is supplied to a plurality of control windings 70, 72, 74 and 76 which are inductively related with the cores as follows: Windings 70 and 74 are wound in inductive relationship with cores 20 and 24 and windings 72 and 76 are inductively related with cores 22 and 26. Windings 70 and 72 constitute a first input to the amplifier, and windings 74 and 76 constitute a second input to the amplifier. The effect of having a signal appearing on either set of control windings is as follows: Assume again a condition in which the upper end of the secondary winding 42 is positive and current is flowing through power windings 10 and 14. With the polarities of the windings as indicated, the current flowing through winding 70 will cause the core 20 to be driven into saturation earlier in the half cycle which results in a reduction in the average voltage drop across winding 10 and an increase in the average voltage drop across the dummy load resistor 44; at the same time, the current flowing through winding 70 tends to delay the saturation of core 24 until later in the half cycle and thereby effectively increases the average voltage drop across winding 14 and reduces the average voltage drop across the dummy load resistor 46. Because of the action of the rectifiers 32 and 36, no significant voltage drop is attributable to current flowing through windings 12 and 16. From the foregoing it would be obvious that the drop across resistor 44 will exceed that across resistor 46 and there will be a significant output voltage measurable between terminals 48 and 50. On the next half cycle, the lower end of the secondary of transformer 42 is conducting and the analogous relationship holds with respect to power windings 12 and 16 and the corresponding control windings 74 and 76. A reversal of the polarity of the control voltage will, of course, result in a reversal of the polarity of the output voltage measured between terminals 48 and 50.

The above discussion relates to the manner in which the control signal acts to vary the output of a magnetic amplifier stage. In understanding the present invention, it will also be useful to consider the reset action of the amplifier. It is quite customary to use shunt resistors connected in parallel with the rectifiers or to use a single shunt resistor connected in parallel with a pair of rectifiers. So connected, the effect of such resistors is to provide a certain amount of negative feedback resulting in a reduction in gain of the amplifier. They also provide a biasing effect which tends to alter the transfer characteristic of the amplifier. In an amplifier of the type shown, it is obvious that the branches must be rather carefully balanced and the shunt resistors tend to compensate somewhat for temperature and aging effects of the rectifiers which would otherwise make this balancing even more difficult to maintain. These shunt resistors also act as reset resistors in that they provide a path for current flow through the nongating windings during the half cycle when it is desired to reset their corresponding cores.

When the shunt resistors are connected across both the rectifiers and the dummy load resistors to the center-tap of the transformer as shown herein, exactly the same functions are accomplished. During the half cycle when windings 10 and 14 are gating or conducting, there is a plus to minus potential existing between the center-tap of the transformer and lower end of the secondary winding and this potential results in a current flow through the reset resistors 62 and 66 and the windings 12 and 16 which is of a polarity tending to reset cores 22 and 26 back into a substantially unsaturated condition. During the opposite half cycle, when windings 12 and 16 are conducting or gating, the current will flow through reset resistor 60 and winding 10 and reset resistor 64 and winding 14 causing the cores 20 and 24 to be driven out of saturation and back into a substantially unsaturated condition. The cores are then placed in a condition to receive the successive half cycles. When the reset resistors are connected simply in parallel with the rectifiers, as described above, there is substantially no current available to reset the core of the nongating power windings until the opposite cores have become saturated. It is also known that the hysteresis loop for any given core becomes wider as the frequency of the input to the associated power winding is increased. Thus for a given increase in frequency of the power supply, the effective portion of the half cycle over which the reset current is available to reset the core of the nongating winding will vary somewhat with frequency. With the arrangement as shown herein, the entire half cycle is always available to reset the cores. Therefore, the variations in the core characteristics which effect the gating winding have no effect whatever on the reset action. As compared with conventional practice, then, the arrangement shown herein permits the reset function to be accomplished through the entire half cycle and subject only to the variations with frequency and voltage of the core actually being reset. As an indication of the results which have been achieved through the use of this arrangement, a standard amplifier was tested using the conventional shunting arrangement where the shunt resistors were connected in parallel with rectifiers only and the results were then compared with the arrangement shown in the present application. The frequency was permitted to vary by about 5 percent and the voltage was varied approximately 10 percent in the opposite direction. Under these conditions, the gain change observed with the conventional arrangement was approximately 7 percent whereas the gain change with the shunt resistors connected to center-tap was approximately half this value. This has proved to be a great advantage, particularly in view of the fact that as compared with placing a shunt resistor in parallel with each of the rectifiers, no additional components are required and as compared with placing one shunt resistor in parallel with two rectifiers, only two additional resistors are required but these resistors may be of smaller power handling capacity and therefore the entire packaging problem may still be somewhat simpler and less expensive to solve than where the two resistors are used.

While only one embodiment of my invention is shown and described herein, it is recognized that modifications may be made to suit the requirements of any particular application.

I claim:

1. A magnetic amplifier comprising a source of alternating current power including a transformer having a center-tapped secondary winding, a first branch including a core of magnetic material and, in series, a power winding inductively related with said core connected to one end of said secondary winding, a unidirectional conducting device, and a first load resistance means connected to said center-tap, a second branch including a core of magnetic material and, in series, a power winding inductively related with said core and connected with the opposite end of said secondary winding, a rectifier, and said first load resistance means connected to said center-tap, a third branch including a core of magnetic material and, in series, a power winding inductively related with said core connected to said one end of said secondary winding, a rectifier, and a second resistance means connected to said center-tap, and a fourth branch including a core of magnetic material and, in series, a power winding inductively related with said core connected to the opposite end of said secondary winding, a rectifier, and said second resistance means connected to said center-tap, a plurality of direct current control windings inductively related with said power windings, and a resistor connected to said center-tap in parallel with each of said rectifiers and said resistance means.

2. A magnetic amplifier comprising a source of alternating current power including a transformer having a center-tapped secondary winding, a first branch including a core of magnetic material and a power winding inductively related with said core connected to one end of said secondary winding, a second branch including a core of magnetic material and a power winding inductively related with said core connected to the opposite end of said secondary winding, a third branch including a core of magnetic material and a power winding inductively related with said core connected to said one end of said secondary winding, and a fourth branch including a core of magnetic material and a power winding inductively related with said core connected to said opposite end of said secondary winding, each of said branches including a unidirectional conducting device, a first load device connected between said center-tap and a junction between said first and second branches, a second load device connected between said center-tap and a junction between said third and fourth branches, a plurality of direct current control windings inductively related with said power windings, and a reset resistor connected to said center-tap in parallel with each of said unidirectional conducting devices and said load devices.

3. For use with a source of alternating current power including a transformer having a center-tapped secondary winding, a magnetic amplifier comprising four branches connected to said transformer in a push-pull, full-wave configuration, each of said branches including a core of magnetic material and a power winding inductively related with said core connected to one end of said secondary winding and a unidirectional conducting device; a first dummy load connected between two of said branches and the center-tap of said transformer; a second dummy load resistor connected between the other two of said branches and said center-tap; and a reset resistor connected to said center-tap in parallel with each of said unidirectional conducting devices and one of said load resistors.

4. A magnetic amplifier comprising a source of alternating current, a plurality of power coils supplied from and connected in a push-pull, full-wave arrangement to said source, a core of magnetic material inductively related to each of said power coils, a control winding inductively related to each of said cores, a rectifier in series with each of said power coils, resistance means connected in series with said power coils and said rectifiers and to said source in such manner as to cause no voltage to be developed across the output of said amplifier unless current is flowing in said control winding, and reset resistors connected in parallel with each of said rectifiers and said resistance means.

5. In combination, a power transformer with a center-tapped secondary winding, a plurality of power windings connected to said transformer and arranged in a push-pull, full-wave relationship, each of said power windings being inductively related to a reactor, at least one direct current control winding inductively related to each of said reactors, a rectifier in series with each of said power windings, load resistance means in series with each of said power windings and said rectifiers connected to said center-tap and arranged in such manner as to cancel the current through said power windings unless a current is flowing through said signal windings, and resistance means connected to said center-tap in parallel with said rectifiers and said load resistance means.

6. A magnetic amplifier comprising a source of alternating current, a plurality of power coils connected in a push-pull, full-wave arrangement to said source, a core of magnetic material inductively related to each of said power coils, a control winding inductively related to each of said cores, a rectifier in series with each power coil, load means connected in series with said power coils and connected to said source, and resistance means connected in parallel with said rectifiers and said load means.

7. In a magnetic amplifier adapted to be connected to a power transformer having a center-tapped secondary winding, said amplifier comprising four branches connected to said secondary winding in a push-pull, full-wave configuration, each of said branches including a core of magnetic material, and, in series, a power winding inductively related with said core, a unidirectional conducting device, and a load device connected to said center-tap, the combination with said amplifier of a reset resistor connected in each of said branches to said center-tap in parallel with each of said unidirectional conducting devices and one of said load devices.

References Cited in the file of this patent

UNITED STATES PATENTS

| | | |
|---|---|---|
| 2,636,150 | McKenney et al. | Apr. 21, 1953 |
| 2,764,719 | Woodson | Sept. 25, 1956 |
| 2,768,345 | Ogle et al. | Oct. 23, 1956 |
| 2,897,296 | Buchhold | July 28, 1959 |